(12) United States Patent
Bouyarmane et al.

(10) Patent No.: US 12,718,426 B1
(45) Date of Patent: Aug. 25, 2026

(54) INTERACTIVE DIFFUSION-BASED IMAGE GENERATION

(71) Applicant: Amazon Technologies, Inc., Seattle, WA (US)

(72) Inventors: Karim Bouyarmane, Seattle, WA (US); Suren Suren Kumar, Seattle, WA (US); Amirhossein Tavanaei, Newcastle, WA (US); Ismail Baha Tutar, Seattle, WA (US); Mehmet Saygin Seyfioglu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 18/619,044

(22) Filed: Mar. 27, 2024

(51) Int. Cl.
*G06T 11/00* (2026.01)
*G06F 3/0484* (2022.01)

(52) U.S. Cl.
CPC ............ *G06T 11/00* (2013.01); *G06F 3/0484* (2013.01); *G06T 2200/24* (2013.01)

(58) Field of Classification Search
None
See application file for complete search history.

(56) References Cited

U.S. PATENT DOCUMENTS

2017/0103502 A1* 4/2017 Gilra ......................... G06T 5/77
2020/0134834 A1* 4/2020 Pao ........................... G06T 7/11
2022/0012568 A1* 1/2022 Pardeshi ................ G06N 3/094
2025/0166133 A1* 5/2025 Kahatapitiya ............. G06T 5/60

OTHER PUBLICATIONS

Zhang et al. (Adding Conditional Control to Text-to-Image Diffusion Models, Computer Vision and Pattern Recognition, 2023) (Year: 2023).*
Ghiasi et al. (Simple Copy-Paste is a Strong Data Augmentation Method for Instance Segmentation, Computer Vision and Pattern Recognition, 2021) (Year: 2021).*
Aubry et al., Seeing 3d chairs: exemplar part481 based 2d-3d alignment using a large dataset of cad models. In Proceedings of the IEEE conference on computer vision and pattern recognition, pp. 3762-3769, 2014.
Avrahami et al., Blended diffusion for text-driven editing of natural images. In Proceedings of the IEEE/CVF Conference on Computer Vision and Pattern Recognition, pp. 18208-18218, 2022.
Bai et al., Single stage virtual try-on via deformable attention flows. In European Conference on Computer Vision, pp. 409-425. Springer, 2022.

(Continued)

*Primary Examiner* — Kyle Zhai
(74) *Attorney, Agent, or Firm* — Knobbe, Martens, Olson & Bear, LLP

(57) ABSTRACT

Systems and methods are provided for an image generation system that can virtually place an object into an image while preserving the details of the object and image using a latent diffusion model. The image generation system can receive an image from a user indicating a region within that image in which to place an object, and, using a reference product image of the object, generate an image inserting that object into the selected region, while still preserving the images details. The image generation system may utilize a dual encoder system, along with a generated guided image, to perform the image generation.

18 Claims, 6 Drawing Sheets

(56) References Cited

OTHER PUBLICATIONS

Bradski, The OpenCV Library. Dr. Dobb's Journal of Software Tools, 2000.
Choi et al., Viton-hd: High-resolution virtual try-on via misalignment-aware normalization. In Proceedings of the IEEE/CVF conference on computer vision and pattern recognition, pp. 14131-14140, 2021.
Gou et al., Taming the power of diffusion models for high-quality virtual try-on with appearance flow. arXiv preprint arXiv:2308.06101, 2023.
Han et al., Viton: An image-based virtual try-on network. In Proceedings of the IEEE conference on computer vision and pattern recognition, pp. 7543-7552, 2018.
Hertz et al., Prompt-to-prompt image editing with cross attention control. arXiv preprint arXiv:2208.01626, 2022.
Ho et al., Classifier-free diffusion guidance. arXiv preprint arXiv:2207.12598, 2022.
Ho et al., Denoising diffusion probabilistic models. Advances in neural information processing systems, 33:6840-6851, 2020.
Karras et al., Analyzing and improving the image quality of stylegan. In Proceedings of the IEEE/CVF conference on computer vision and pattern recognition, pp. 8110-8119, 2020.
Kawar et al., Imagic: Text-based real image editing with diffusion models. In Proceedings of the IEEE/CVF Conference on Computer Vision and Pattern Recognition, pp. 6007-6017, 2023.
Kim et al,. Diffusionclip: Text-guided diffusion models for robust image manipulation. In Proceedings of the IEEE/CVF Conference on Computer Vision and Pattern Recognition, pp. 2426-2435, 2022.
Kirillov et al., Segment anything. arXiv preprint arXiv:2304.02643, 2023.
Kosar, Feature-wise Linear Modulation Layer, Jul. 27, 2023, available at https://vaclavkosar.com/ml/Feature-wise-Linear-Modulation-Layer.
Lee et al., High-resolution virtual try-on with misalignment and occlusion-handled conditions. In European Conference on Computer Vision, pp. 204-219. Springer, 2022.
Lewis et al., Tryongan: Body-aware try-on via layered interpolation. ACM Transactions on Graphics (TOG), 40(4):1-10, 2021.
Liu et al., Grounding dino: Marrying dino with grounded pre-training for open-set object detection. arXiv preprint arXiv:2303.05499, 2023.
Oquab et al., Dinov2: Learning robust visual features without supervision. arXiv preprint arXiv:2304.07193, 2023.
Perez et al., Film: Visual reasoning with a general conditioning layer. In Proceedings of the AAAI conference on artificial intelligence, 2018.
Radford et al., Learning transferable visual models from natural language supervision. In International conference on machine learning, pp. 8748-8763. PMLR, 2021.
Ramesh et al., Zero-shot text-to-image generation. In International Conference on Machine Learning, pp. 8821-8831. PMLR, 2021.
Rombach et al., High-resolution image synthesis with latent diffusion models. In Proceedings of the IEEE/CVF conference on computer vision and pattern recognition, pp. 10684-10695, 2022.
Ruiz et al., Dreambooth: Fine tuning text-to-image diffusion models for subject-driven generation. In Proceedings of the IEEE/CVF Conference on Computer Vision and Pattern Recognition, pp. 22500-22510, 2023.
Saharia et al., Photorealistic text-to-image diffusion models with deep language understanding. Advances in Neural Information Processing Systems, 35:36479-36494, 2022.
Seyfioglu et al., Dreampaint: Fewshot inpainting of e-commerce items for virtual try-on without 3d modeling. arXiv preprint arXiv:2305.01257, 2023.
Shum et al., Conditional 360-degree image synthesis for immersive indoor scene decoration. In Proceedings of the IEEE/CVF International Conference on Computer Vision, pp. 4478-4488, 2023.
Simonyan et al., Very deep convolutional networks for large-scale image recognition. arXiv 598 preprint arXiv:1409.1556, 2014.
Sohl-Dickstein et al., Deep unsupervised learning using nonequilibrium thermodynamics. In International conference on machine learning, pp. 2256-2265. PMLR, 2015.
Song et al., Denoising diffusion implicit models. arXiv preprint arXiv:2010.02502, 2020.
Song et al., Score-based generative modeling through stochastic differential equations. arXiv preprint arXiv:2011.13456, 2020.
Song et al., Objectstitch: Object compositing with diffusion model. In Proceedings of the IEEE/CVF Conference on Computer Vision and Pattern Recognition, pp. 18310-18319, 2023.
Xie et al.,Holistically-nested edge detection. In Proceedings of the IEEE international conference on computer vision, pp. 1395-1403, 2015.
Xie et al., Gpvton: Towards general purpose virtual try-on via collaborative local-flow global-parsing learning. In Proceedings of the IEEE/CVF Conference on Computer Vision and Pattern Recognition, pp. 23550-23559, 2023.
Xue et al., Dccf: Deep comprehensible color filter learning framework for high-resolution image harmonization. In European Conference on Computer Vision, pp. 300-316. Springer, 2022.
Yan et al., Linking garment with person via semantically associated landmarks for virtual try-on. In Proceedings of the IEEE/CVF Conference on Computer Vision and Pattern Recognition, pp. 17194-17204, 2023.
Yang et al., Paint by example: Exemplar-based image editing with diffusion models. In Proceedings of the IEEE/CVF Conference on Computer Vision and Pattern Recognition, pp. 18381-18391, 2023.
Zhan et al., What does stable diffusion know about the 3d scene? arXiv preprint arXiv:2310.06836, 2023.
Zhang et al., Adding conditional control to text-to-image diffusion models. In Proceedings of the IEEE/CVF International Conference on Computer Vision, pp. 3836-3847, 2023.
Zhu et al., Tryondiffusion: A tale of two UNets. In Proceedings of the IEEE/CVF Conference on Computer Vision and Pattern Recognition, pp. 4606-4615, 2023.

* cited by examiner

INTERACTIVE DIFFUSION-BASED IMAGE GENERATION

BACKGROUND

Generative artificial intelligence (AI) models or systems can be trained to generate different types of content, such as text, images, and multimedia. A trained generative AI model may receive a prompt or question from a user and then generate text or images as a response or answer to the prompt or question from the user. Diffusion models may be categorized as a form of generative AI that can generate images given a text or image input. For example, a diffusion model may receive text and an image as input (e.g., the image is of a synthetic human head and the text requests a hat to be put on the synthetic human head) and produce a new image as an output (e.g., the new image depicts the synthetic human head wearing a hat).

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
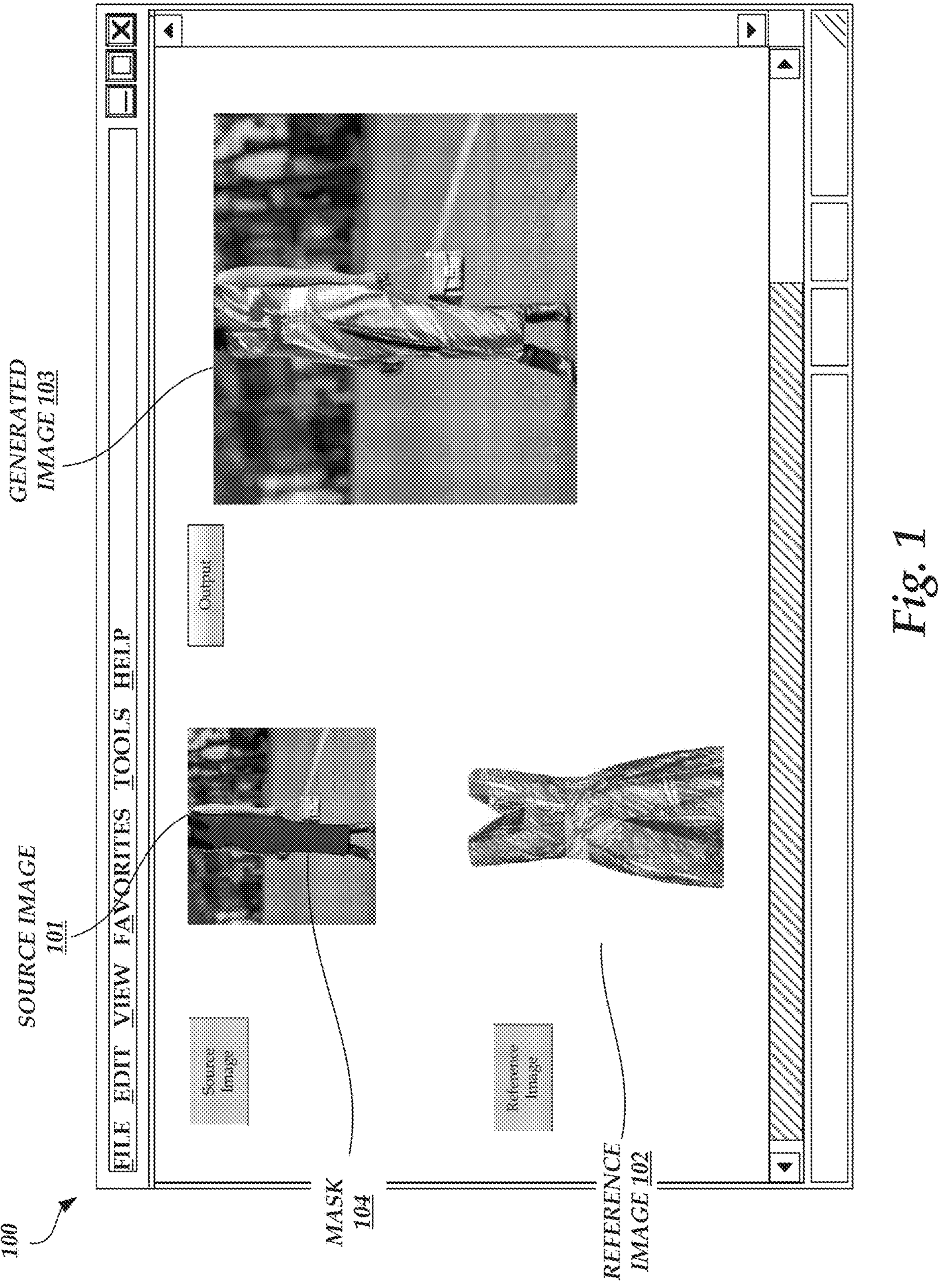
FIG. 1 depicts an example user interface (UI) where the system may generate an image based on a user selected object to be added to a source image and a user selection of an area of the source image to add the object.

Generally described, aspects of the present disclosure relate to an image generation system that can virtually place an object into an image while preserving the details of the object and image using a latent diffusion model. The system can take an image from a user, have the user select a region within that image in which to place an object, and, using a reference product image of the object from a catalog, generate an image inserting that object into the selected region, while still preserving the images details. The system may operate on an "in-the-wild" user image (as opposed to staged studios or professional human model images with predefined poses) and reference image. In addition, the system may integrate the reference product harmoniously with the surrounding context while maintaining the product's identity (as opposed to replacing the product with a generic image of a product from a similar category). The system may perform fast inference to facilitate real-time usage across a large volume of products and users.

Currently, existing image generation systems tend to be specialized. For example, instead of allowing for general purpose image generation, existing image generation models are developed for specific tasks and domains (e.g., a specific model for clothing generation, a specific model for furniture generation, a specific model for eyeglasses, etc.). These existing models also focus on limited contexts or controlled environments, such as certain parts of clothing or limited stock images. In addition, these existing models may be limited to generation of a generic form of an object (e.g., generating a generic baseball cap that does not resemble any specific real-world cap), as opposed to maintaining the specific features of an input object (e.g., a specific reference baseball cap from a particular brand). Other approaches utilize expensive three-dimensional (3D) augmented reality (AR)/virtual reality (VR) technologies for inserting items in an image that are difficult to scale to items from very large catalogs of items, particularly when the items lack 3D models. Therefore, a general purpose model that enables a user to digitally interact with any product from any category in any setting is needed.

Embodiments of the present disclosure address the above-mentioned problems by providing a diffusion-based model (such as a diffusion model using U-Net) that can virtually place an object into an image while preserving the details of the object and image. Diffusion models are a technique of two-dimensional generative modeling, which inherently grasp the nuances of the 3D world, exhibiting a degree of geometry and physics awareness. The image generation system in the present disclosure may utilize a latent diffusion model which can incorporate fine-grained cues from a reference image into a U-Net decoder using a secondary U-Net encoder. The system can create and integrate a pixel-level "hint" into the masked region of an empty image, which may then be processed through a shallow convolutional network, ensuring dimensional alignment with the masked image processed by a Variational Autoencoder (VAE). The system can blend the source and reference images, maintaining the integrity and details of the reference images. Furthermore, perceptual loss may be employed using a pre-trained Visual Geometry Group (VGG) model to further enhance alignment of basic features, such as color. The system can handle "in-the-wild" images and references, preserve fine-grained details of products while ensuring integration into the scene of the source image, and facilitate rapid zero-shot inference.

The model of the system can be trained on a training dataset with sampled source-reference pairs and a public dataset, such as VITON-HD-NoFace. VITON-HD-NoFace is a public dataset for high-resolution virtual try-on of clothing items. The training dataset may also be an in-house training dataset composed of product images.

The image generation system can integrate a single product image into a user-specified region within a user-specified image, ensuring the preservation of the products fine-grained details and its harmonious blend with the target image. The image generation system can leverage an auxiliary U-Net alongside a primary U-Net within a latent diffusion model, such as Stable Diffusion v1.5. Stable Diffusion is a generative AI model that produces images based on a text or image prompt. The auxiliary U-Net can protect the details of the reference image that may otherwise be lost due to the latent nature of diffusion models and the limitations of image conditioning. Therefore, the fine-grained details of the reference image are directly infused into the main U-Net decoder via affine transformations, ensuring preservation of the reference product's details in the generated image.

In one embodiment, the image generation system can receive a picture of a user and determine how a number of shirts (or other article of clothing) look on the user. Then, using another model (e.g., a coherence model), the system can determine if that overall look is coherent.

Turning to the figures, FIG. 1 depicts an example user interface (UI) 100, where the system may generate an image based on a user selected object to be added to a source image 101 and a user depiction of an area of the source image to add the object. The UI 100 includes a source image 101, where an end user may indicate the mask 104, and a reference image 102. The source image 101 may be an image that a user wishes to insert an object into or alternatively replace an object in the image for a different object. For example, as depicted in FIG. 1, the source image 101 is an image of a woman wearing a dress. The user may wish to replace the woman's dress with another dress to see how the other dress may look on the woman. The source image 101 can be any image "in-the-wild" (e.g., it need not be created in staged studios or depict professional human model images with predefined poses). Therefore, the source image 101 can depict a number of different kinds of scenes. For example, as will be described with respect to FIG. 4, the source image 101 may depict a room where the user wishes to insert a piece of furniture.

In one embodiment, the source image 101 may be uploaded by the user via the UI 100. For example, there may be a button or other method of input for the user to upload the source image 101 for use in the UI 100. However, this is not meant to be limiting or required, as there may be other methods of acquiring the source image 101.

Using the UI 100, the user may select or indicate an area of the source image 101 where they wish the object to be inserted in the image, shown in FIG. 1 as the mask 104. In one embodiment, the mask 104 may be automatically generated by the system instead of via a user selection. The mask 104 can be used by the system to generate the resulting generated image 103. The system can maintain the configurations and dimensions of the mask 104. For example, for a piece of clothing such as a shirt, the mask may cover a part of the arms and end at the waistband of the pants, indicating that the user wishes the reference shirt to be inserted as short-sleeved and tucked into the pants. In the example of source image 101, the user may have "drawn" on the image 101 (e.g., using a cursor or touchscreen gestures) in order to create the shape of a dress, where the length of the dress may be different than the dress actually worn by the woman depicted in source image 101. When the system generates the generated image 103, the reference dress will be depicted as having the general dimensions (e.g., sleeve length and overall length) as the mask 104. As another example, if a mask for inserting a shirt covers the entire arm and is drawn over pants, the reference shirt in the generated image will be depicted as long-sleeved and not tucked in, whereas a mask drawn from the waist up may result in a generated image depicting a tucked-in shirt.

The reference image 102 may be an image depicting the object the user wishes to insert into the source image 101. The reference image 102 may be a reference product image of the object from a catalog or other database.

In one embodiment, similar to the source image 101, the reference image 102 may be uploaded by the user via the UI 100. For example, there may be a button or other method of input for the user to upload the reference image 102 for use in the UI 100. However, this is not meant to be limiting or required, as there may be other methods of acquiring the reference image 102.

Based on the source image 101, the mask 104, and the reference image 102, the system can create a generated image 103. The generated image 103 depicts the object in the reference image 102 inserted into the region of the mask 104. Methods for generating such an image will be further described in detail below.

In some embodiments, the UI 100 may provide the user with an option to select the source image 101 or reference image 102 from a set of images. In one embodiment, the UI 100 may provide the user with selectable settings for the generated image 103. For example, the UI 100 may include settings for a guidance scale, a hint scale, a gaussian blending kernel size, gaussian sigma, steps, seed, and/or other settings.

Figure 2:
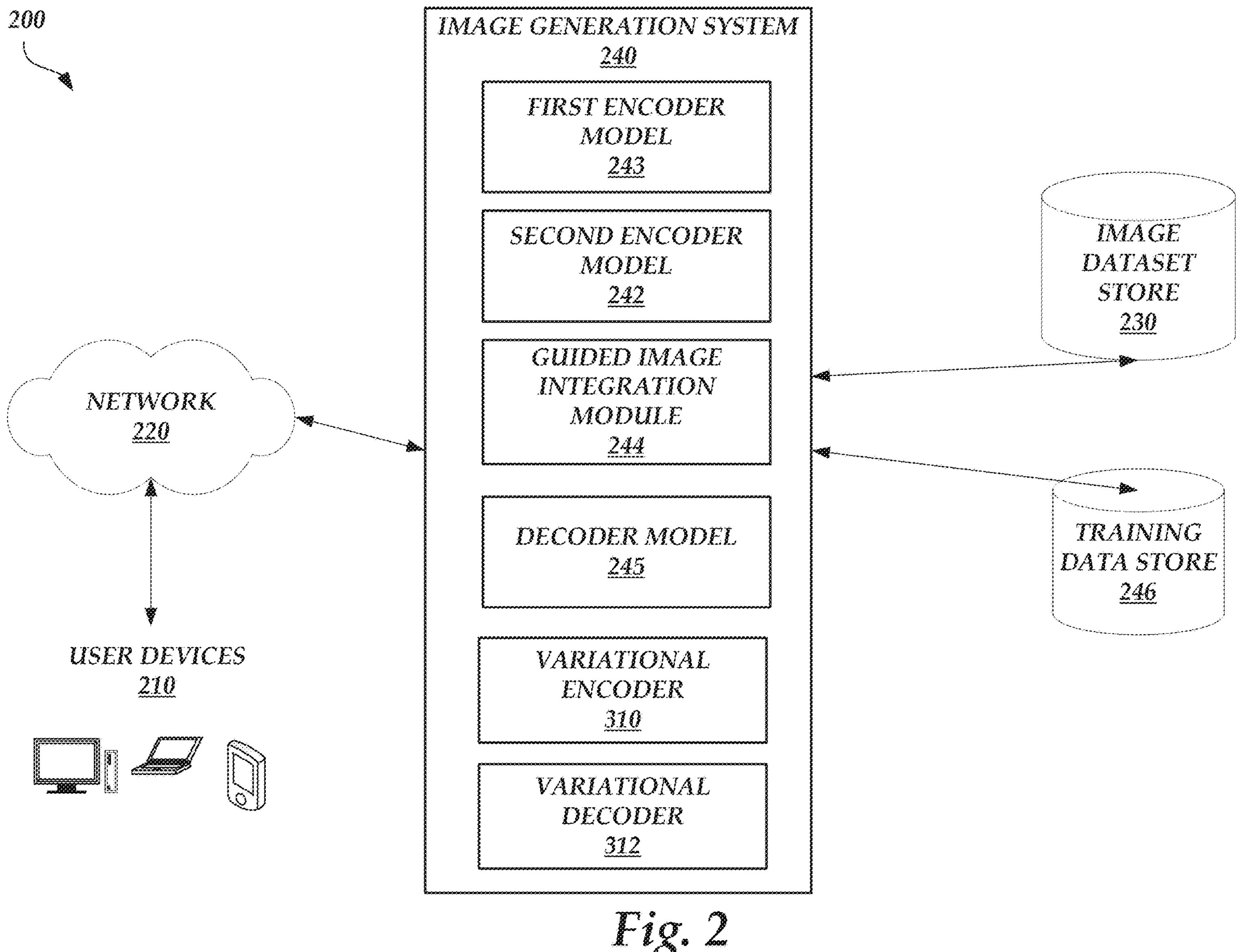
FIG. 2 is a block diagram depicting an illustrative environment in which an image generation system can generate an image depicting a user-selected object inserted into a source image.

FIG. 2 is a block diagram depicting an illustrative computing environment 200 in which an image generation system 240 can generate an image depicting a user-selected object inserted into a source image. The image generation system 240 includes a second encoder model 242, a first encoder model 243, a guided image integration module 244, a decoder model 245, a variational encoder 310, and a variational decoder 312. The image generation system 240 may be in communication with an image dataset store 230 and a training data store 246. The training data store 246 may include training data that may be used by the image generation system 240 to train the various machine learning models described herein. Although the training data store 246 is depicted in FIG. 2 as included separate from the image generation system 240, it will be appreciated that in other embodiments, the training data store 246 is in or locally accessed by the image generation system 240. The image dataset store 230 may include a collection of images to be used by the image generation system 240 for image generation. For example, the image dataset store 230 may contain a catalog of images that may be used to create a generated image 103. Similar to the training data store 246, although the image dataset store 230 is depicted in FIG. 2 as included separate from the image generation system 240, it will be appreciated that in other embodiments, the image dataset store 230 is in or locally accessed by the image generation system 240.

User device(s) 210 (hereinafter referred to as "user device 210" for ease of reference) illustratively correspond to any computing device that provides a means for a user to interact with components of image generation system 240. User device 210 may include user interfaces or dashboards that connect a user with a machine, system, or device. In various implementations, user device 210 includes computer devices with a display and a mechanism for user input (e.g., mouse, keyboard, voice recognition, touch screen, and/or the like). For example, the user device 210 includes a desktop, tablet, e-reader, server, wearable device, laptop or tablet computer, smartphones, gaming consoles, personal digital assistants (PDAs), hybrid PDA/mobile phone, mobile phone, electronic book reader, set-top box, voice command device, camera, digital media player, and the like. The user device 210 can access a cloud provider network via the network 220 to view or manage their data and computing resources, as well as to use websites and/or applications hosted by the cloud provider network. Elements of the cloud provider network may also act as clients to other elements of that network. Thus, user device 210 can generally refer to any device accessing a network-accessible service as a client of that service.

The components of the image generation system 220 may be communicatively coupled via a network 220. The network 220 can include any appropriate network, including wired network, wireless network, or combination thereof. For example, network 220 may be a personal area network, local area network, wide area network, cable network, satellite network, cellular network, or any other such network or combination thereof. As a further example, the network 220 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 220 may be a private or semi-private network, such as a corporate or university intranet. The network 220 may include one or more wireless networks, such as a Global System for Mobile Communications (GSM) network, a Code Division Multiple Access (CDMA) network, a Long-Term Evolution (LTE) network, C-band, mmWave, sub-6 GHZ, or any other type of wireless network. The network 220 can use protocols and components for communicating via the Internet or any of the other aforementioned types of networks. For example, the protocols used by the network 220 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 220 can represent a network that may be local to a particular organization, e.g., a private or semi-private network, such as a corporate or university intranet. In some implementations, devices communicate via the network 220 without traversing an external network, such as the Internet. Devices connected via the network 220 in this case may be walled off from accessing the Internet. As an example, the network 220 may not be connected to the Internet. Accordingly, e.g., the user device 102 may communicate with the image generation system 240 directly (via wired or wireless communications) or via the network 220, without using the Internet. Thus, even if the network 220 or the Internet is down, the image generation system 240 may continue to communicate and function via direct communications (and/or via the network 220).

The second encoder model 242 and the first encoder model 243 may be machine learning models, such as transformer-based models, that can convert images to representations that are readable and understandable to the model. The second encoder model 242 and the first encoder model 243 may be U-Net models or other type of convolutional neural network (CNN). The decoder model 245 can be used to then decode the output of each encoder model in order to facilitate generation of the generated image 103.

In some embodiments, the decoder model 245 may utilize a U-Net architecture or other encoder-decoder and/or neural network architecture to perform image segmentation. A decoder of the image generation system 240 may then retrieve or receive packaged or combined feature sets from the first encoder model 243 or second encoder model 242, and then semantically segment parts of the source image. For example, utilizing the U-Net architecture, the decoder model 245 may take the identified features or properties from the encoder models and label each pixel of the reference image as one or more regions. The decoder model 245 of the image generation system 240 can then transfer properties from the reference image to the source image. For example, utilizing the U-Net architecture, the decoder model 245 may take the properties from first encoder model 243 and the features from the guided image integration module 244 and integrate the properties and features to reconstruct the images such that the object from the reference image can be transferred to the source image in the reconstructed image.

The guided image integration module 244 may be a general-purpose method for neural networks for image stylization. The guided image integration module 244 can use conditional normalization methods to align features from the two encoder models, which can be used to facilitate the insertion of the object in the masked region. For example, the guided image integration module 244 may use Feature-wise Linear Modulation (FILM).

The variational encoder 310 processes an image to yield a latent representation of the image. The variational encoder 310 may be an artificial neural network that may map an input to a latent space according to input parameters. The variational encoder 310 can be used to create variational autoencoder (VAE) output dimensions of the source image 101. The variational decoder 312 can process the output of the variational encoder 310 as aligned with the features of the second encoder model 242 using the guided image integration module 244 to decode the latent representation. The variational decoder 312 is another neural network that can map the latent space to the input space, in order to generate corresponding data, such as an image.

Figure 3:
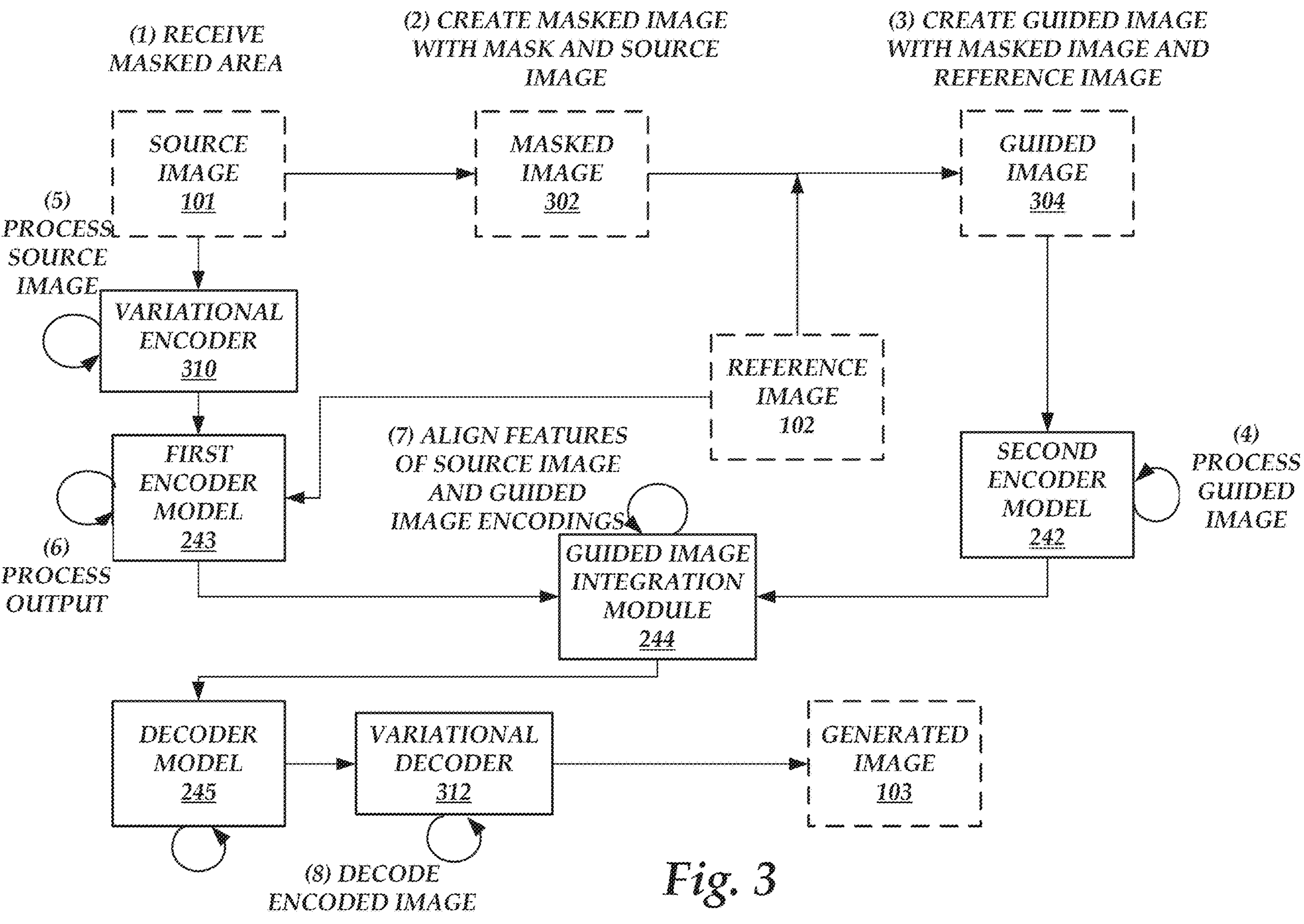
FIG. 3 depicts illustrative interactions between the components of an image generation system as described herein.

FIG. 3 depicts illustrative interactions between the components of an image generation system 240 to incorporate an object within a user-defined region of a source image. The process begins at (1), where the image generation system 240 receives a masked area of a source image 101 from a user. As described above, the source image 101 may be an image that a user wishes to insert an object into or alternatively replace an object in the image for a different object. An end user may draw the masked area on the source image 101 to indicate the portion of the image that they wish to incorporate the object. For example, the user may draw the masked area using a user interface such as the UI 100 of FIG. 1.

At (2), the image generation system 240 creates a masked image 302 based on the source image 101 using the mask. The masked image 302 includes a depiction of the masked area incorporated into the source image 101. For example, the masked image may depict the source image 101 with the masked area deleted or removed (e.g., a black or empty space) from the source image 101.

At (3), the image generation system 240 creates the guided image 304 using the masked image 302 and a reference image 102. As described above, the reference image 102 may be an image depicting the object the user wishes to insert into the source image 101. In one embodiment, the user may wish to insert multiple objects into the source image 101. In that case, there may be more than one reference images 102. For example, the user may wish to see how a pair of shoes and a shirt look together on a model. The guided image 304 is created by inserting an adapted and scaled version of the reference image 102 within the masked area from the masked image 302. For example, the guided image 304 may be created by resizing the reference image 102 to fit within the coordinates of the masked area and inserting the reference image 102 within the coordinates of the designated mask in a blank image.

According to some embodiments, the process to create the guided image 304 (which may alternatively be considered a "hint" image) begins by creating an image of zeros identical in size to the source image 101. Subsequently, the reference image 102 is resized and inserted within the coordinates of the masked area within the image of zeros, therefore creating the first version of the guided image 304. The guided image 304 may contain pixel-level dimensions that can be adapted by a shallow convolutional neural network (CNN). The CNN can be used to align the guided image 304 with the output dimensions of the source image 101. The same masked area from (1) is applied to the source image 101, resulting in a masked source image. This masked source image undergoes processing by a VAE encoder to yield a latent representation, for example, sized 64×64×4. The latent representation may be a simplified version of the masked source image. The guided image 304 is subsequently processed by an adapter module to match with the dimensions of the latent representation. In one example, the adapter module may be a shallow CNN comprising four layers.

Finally, the guided image 304 (following processing from the adapter module) and the latent representation of the masked source image may be added elementwise to produce the final representation of the guided image 304, which is then processed by the second encoder model 242 at (4). The second encoder model 242 may be a trainable replica of the first encoder model 243. The secondary second encoder model 242 can serve to guide the first encoder model 243 by exerting a potent pixel-wise influence from the reference image 102 during the decoding process. Using this process, the image generation system 240 can maintain a distinct representation for the guided image 304 at the pixel level, while keeping the source image in latent form which provides complementary signals that yield superior results. The second encoder model 242 can generate feature maps of varying resolutions at each level.

At (5), the variational encoder 310 processes the source image 101. The variational encoder 310 can be used to create VAE output dimensions of the source image 101. At (6), the first encoder model 243 processes the VAE output dimensions of the source image 101. The fine-grained details of the reference image may be directly infused into the first encoder model 243 via affine transformations. In this way, the reference object's details are preserved in the generated image.

Although FIG. 3 depicts steps (5) and (6) being performed serially (e.g., one after the other) after steps (2), (3), and (4), the illustration is provided by way of example only, and is not intended to be limiting or required. In some embodiments, steps (5) and (6) may be performed in parallel (e.g., concurrently) with or before steps (2), (3), and (4), asynchronously, or in some other manner. For example, steps (5) and (6) and steps (2), (3), and (4) may be performed in various sequences. In one example, steps (5) and (6) are performed first, followed by steps (2), (3), and (4). Alternatively, steps (2), (3), and (4) are performed first, followed by steps (5) and (6).

Then, the image generation system 240 can integrate the guided image 304 into the output of the first encoder model 243. At (7), the guided image integration module 244 affinely aligns the output skip-connected features of the source image 101 from the first encoder model 243 and the output pixel-level features of the guided image 304 from the second encoder model 242, resulting in an output encoding. The output skip connected features may include features of the source image 101 preserved through the first encoder model 243. The skip connected features may be used to pass more detailed aspects of the features to the decoder that may otherwise be lost during the encoding process. The output skip-connected features and output pixel-level features can be affinely aligned by applying an affine transformation to the features, such as with FILM (which is a known approach to change output of a general model, configured to accept primary inputs, based on or more conditioning features as additional input). These aligned feature maps, in conjunction with the main image conditioning, facilitate the inpainting of the masked region. In one embodiment, the output features may be integrated using other methods, such as direct addition of the features at each level and Cross Attention.

At (8), the encoding output from the guided image integration module 244 are decoded in order to generate the generated image 103. First, the decoder model 245 decodes the encodings from the encoder models by taking the encoded features and reconstructing the features to create a segmentation map of the image. Then, the variational decoder 312 decodes the VAE output by decompressing the features from the encoded space. The decoding processes can allow the image generation system 240 to generate the image by reconstructing the features in a way that allows image generation. Therefore, using the decoded encodings, the image generation system 240 can create the generated image 103.

Figure 4:
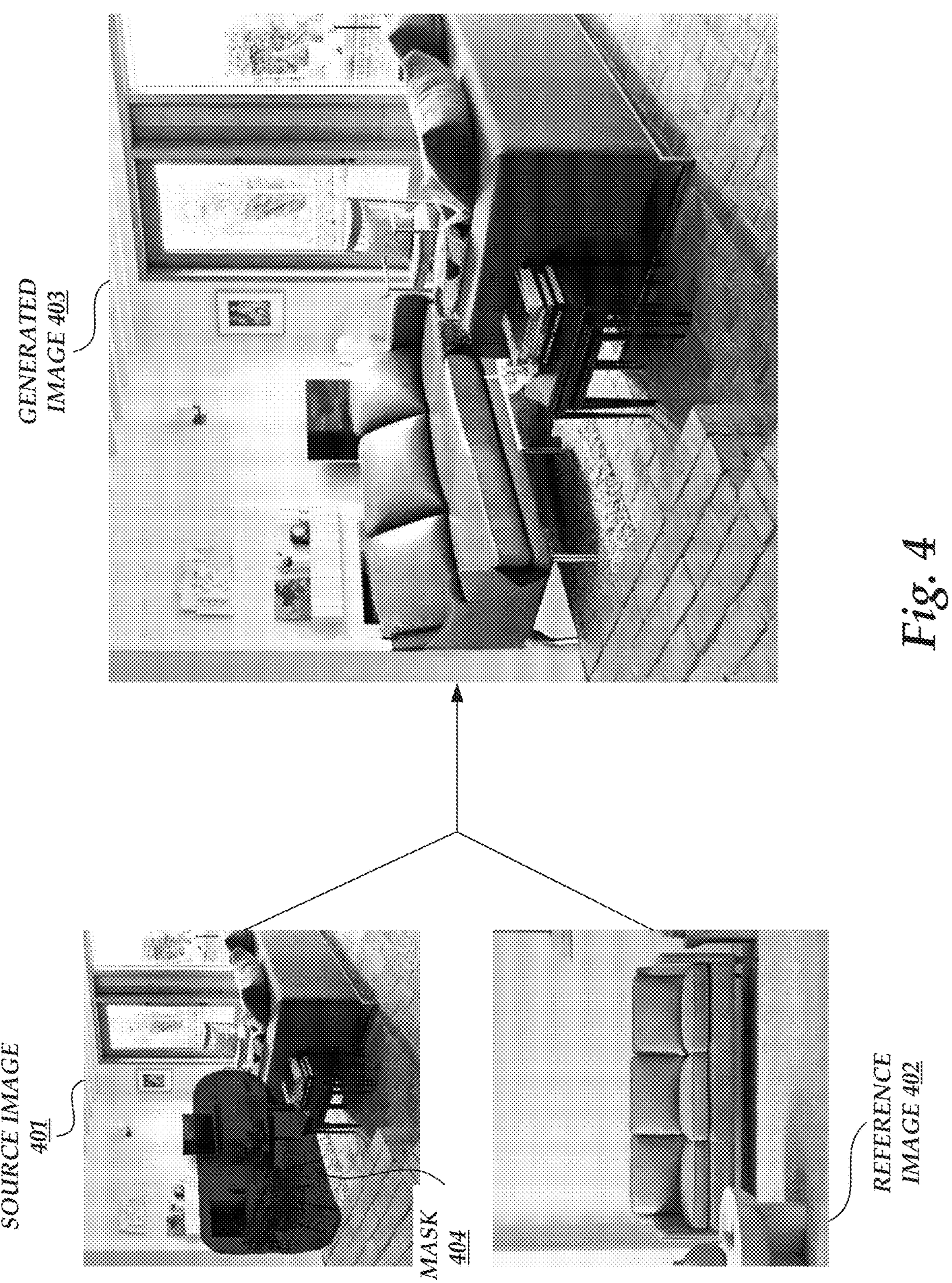
FIG. 4 provides a graphical representation of various steps in a process of generating an image based on a source image with a mask and a reference image.

FIG. 4 provides a graphical representation of various steps in a process of generating an image based on a source image 401 with a mask 404 and a reference image 402. As depicted in FIG. 4, the source image 401 depicts a living room containing a table, chair, and a couch. The mask 404 is drawn over the table and chair in the source image 401, indicating that the user wishes to insert the object in the reference image 402 into the area depicted in the mask 404. In this case, the reference image 402 shows a sofa.

The generated image 403 then depicts the sofa from the reference image 402 inserted into the source image 401 in the area indicated in the mask 404. The couch from the reference image 402 has also replaced the table and chair that was inside the mask 404 area. As shown, the couch as generated in the generated image 403 generally appears to be realistically placed in the real-world environment depicted in source image 401 (e.g., with a different perspective and lighting than the couch had in the reference image 402).

Figure 5:
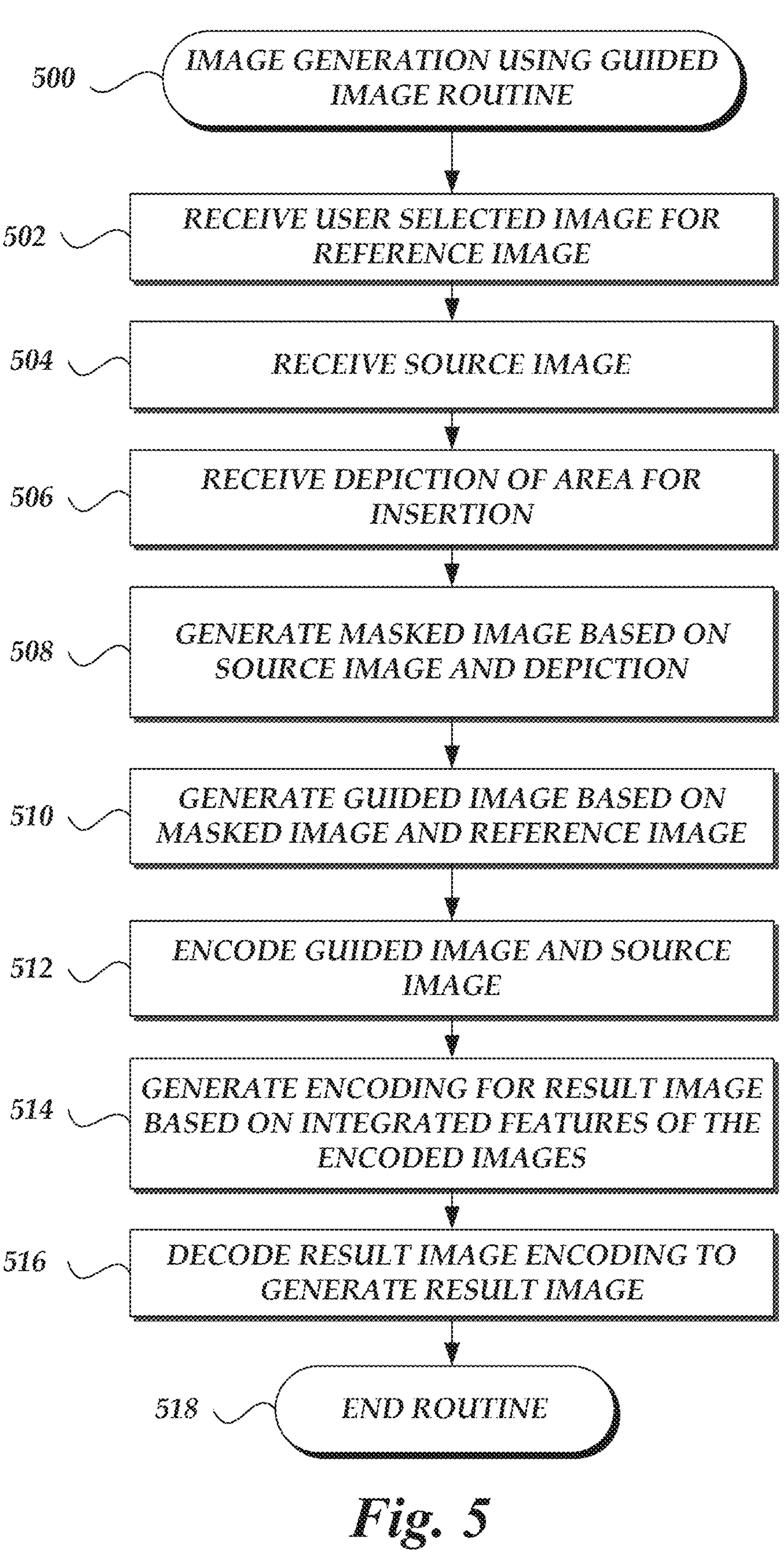
FIG. 5 is a flow chart depicting an example routine for generating an image based on a guided image.

FIG. 5 is a flow chart depicting an example routine 500 for generating an image based on a guided image. The routine 500 begins at block 502 where the image generation system 240 receives a user selected image for a reference image. The reference image depicts an object that the user wishes to insert into a source image, as received at block 504. This object may be a piece of furniture, an item of clothing, or the like.

At block 504, the image generation system 240 receives a source image, as input by the user. The source image may depict any scene, a person wearing an item of clothing, etc., such as the source image 101 as depicted in FIG. 1 or the source image 401 as depicted in FIG. 4. In one example, the user may input the source image using a user interface, such as the UI 100 depicted in FIG. 1. This image may be any image "in-the-wild."

At block 506, the image generation system 240 receives a depiction of the area for inserting the object from the reference image. The reference image may also be input into the system, for example by way of the UI 100 as depicted in FIG. 1. The reference image depicts an object that the end user wishes to insert into the source image, such as a piece of clothing, furniture, etc. The depiction may be drawn onto or otherwise input the source image by the user, such as the mask 104 as depicted in FIG. 1. Alternatively, the depicted may be automatically generated by the system to cover the area for inserting the object.

At block 508, the image generation system 240 generates a masked image based on the source image from block 504 and the depiction from block 506. The masked image may depict the source image with the masked area deleted (e.g., a black box) from the source image 101. The process by which the masked image is created is described in more detail above with respect to FIG. 3.

At block 510, the image generation system 240 generates a guided image based on the masked image and the reference image. As described above with respect to FIG. 3, the guided image may be created by inserting an adapted and scaled version of the reference image within the masked area from the masked image. The guided image contains pixel-level dimensions that can be adapted by a shallow CNN to align with the dimensions of the source image.

At block 512, the image generation system 240 encodes the guided image and the source image. The guided image and the source image may be encoded using two separate encoder models (such as U-Net), such as the first encoder model 243 and the second encoder model 242 of FIG. 2 and FIG. 3. The encoder models process the images to generate an output encoding the features of the input images.

At block 514, the image generation system 240 generates encodings for a result image based on integrated features of the two encoded images corresponding to the encoded guided image and the encoded source image. For example, the features from the two encoded images as output by the two encoder models may be integrated using FILM.

At block 516, the image generation system 240 decodes the result image encoding to generate a result image. The result image depicts the object from the reference image inserted into the source image in the area of the user-depiction. The routine ends at block 518.

Figure 6:
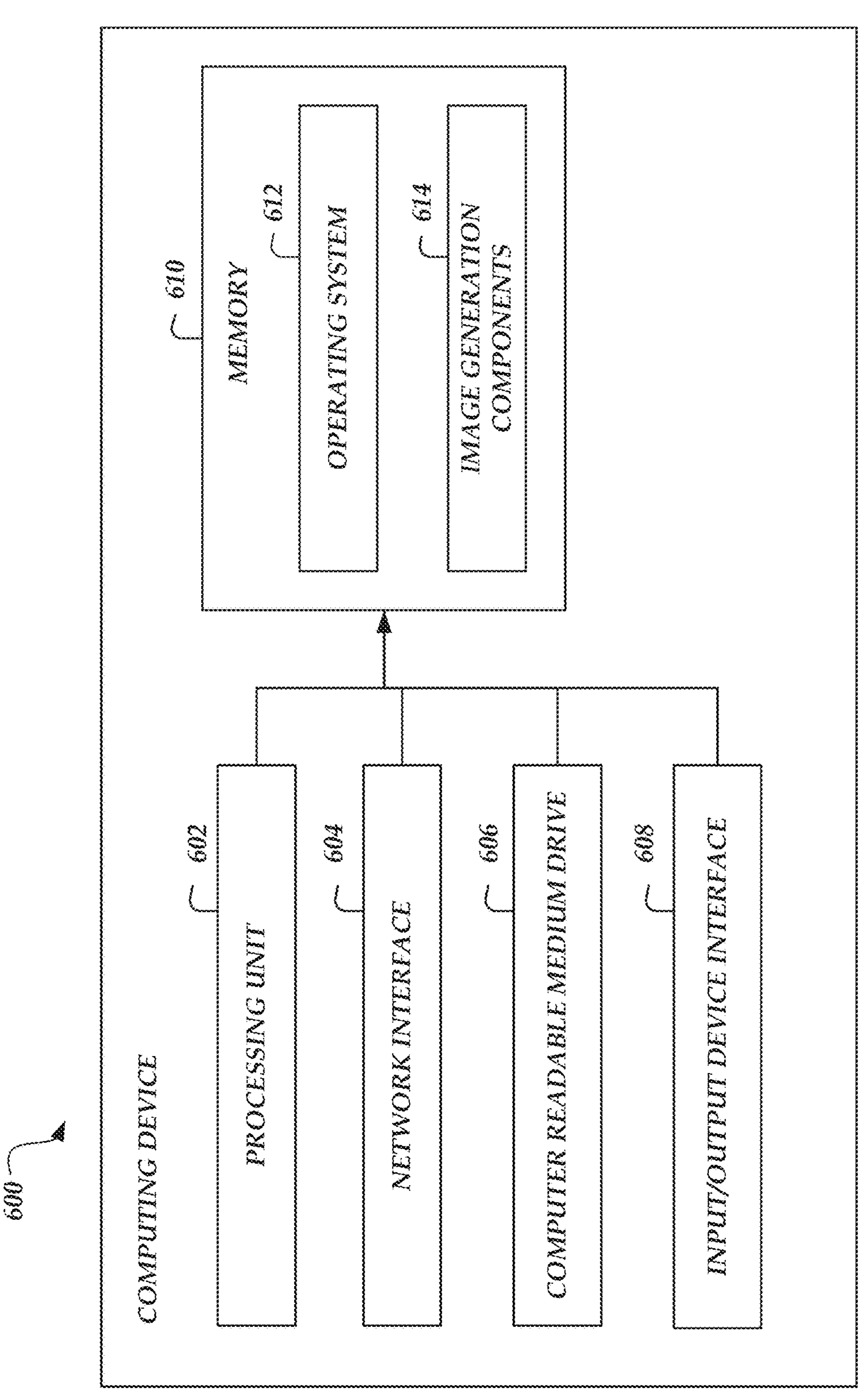
FIG. 6 shows an example computing device that may be used to implement aspects of the present disclosure.

FIG. 6 shows an example computing device 600 that may be used to implement aspects of the present disclosure. The general architecture of the system depicted in FIG. 6 includes an arrangement of computer hardware and software that may be used to implement aspects of the present disclosure. The hardware may be implemented on physical electronic devices, as discussed in greater detail below. The system may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 2. As illustrated, the system includes a processing unit 602, a network interface 604, a computer-readable medium drive 606, and an input/output device interface 608, all of which may communicate with one another by way of a communication bus.

The network interface 604 may provide connectivity to one or more networks or computing systems. The processing unit 602 may thus receive information and instructions from other computing systems or services via the network. The processing unit 602 may also communicate to and from memory 610 and further provide output information for an optional display (not shown) via the input/output device interface 608. The input/output device interface 608 may also accept input from an optional input device (not shown).

The memory 610 may contain computer program instructions (grouped as units in some embodiments) that the processing unit 602 executes in order to implement one or more aspects of the present disclosure, along with data used to facilitate or support such execution. While shown in FIG. 6 as a single set of memory 610, memory 610 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 610 may store an operating system 612 that provides computer program instructions for use by the processing unit 602 in the general administration and operation of image generation components 614. The memory 610 may further include computer program instructions and other information for implementing aspects of the present disclosure. The image generation components 614 may represent code executable to generate an image using a reference image and a source image. The image generation components 614 may include the first encoder model 243, second encoder model 242, guided image integration module 244, decoder model 245, variational encoder 310, and variational decoder 312 shown in FIG. 2. The computing device 600 may be an example image generation system 240. However, user devices 210 may also include hardware similar to computing device 600.

The system of FIG. 6 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 6 as image generation components 614, similar components may be utilized in some embodiments to implement the user device 210 shown in FIG. 2.

Some or all of the analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:

receiving a user selection of an object to be added to a source image;

receiving a selection of an area of the source image to add the object;

generating a masked image based on the source image and the selection;

generating a guided image based on the masked image and a reference image depicting the object, wherein generating the guided image comprises generating a blank image and inserting, into a region of the blank image that is determined from the masked image, an adapted version of the reference image having dimensions matched to the region;

processing the guided image and the source image through one or more encoder models to generate a guided image encoding and a source image encoding;

generating a result image encoding based on integrating the guided image encoding into the source image encoding; and generating a result image, wherein generating the result image comprises decoding the result image encoding.

2. The computer-implemented method of claim 1, wherein generating the result image further comprises generating the result image using a latent diffusion model.

3. The computer-implemented method of claim 1, wherein the guided image comprises pixel-level features of the reference image inserted into the masked image.

4. The computer-implemented method of claim 1, wherein integrating the guided image encoding into the source image encoding comprises aligning pixel-level features of the guided image with features of the source image.

5. The computer-implemented method of claim 1, wherein the one or more encoder models comprise a first encoder model and a second encoder model, wherein the second encoder model is a trainable replica of the first encoder model.

6. The computer-implemented method of claim 1, wherein processing the guided image and the source image through the one or more encoder models comprises:

processing the guided image and the source image through a variational autoencoder; and processing the guided image and the source image through the one or more encoder models.

7. The computer-implemented method of claim 1, wherein the guided image comprises the adapted version of the reference image inserted within the selection of the masked image.

8. A non-transitory computer-readable medium storing specific computer-executable instructions that, when executed by a processor, cause the processor to at least:

receive a user selection of an object to be added to a source image;

receive a selection of an area of the source image to add the object;

generate a masked image based on the source image and the selection;

generate a guided image based on the masked image and a reference image depicting the object, wherein generating the guided image comprises generating a blank image and inserting, into a region of the blank image that is determined from the masked image, an adapted version of the reference image having dimensions matched to the region;

process the guided image and the source image through one or more encoder models to generate a guided image encoding and a source image encoding;

generate a result image encoding based on integrating the guided image encoding into the source image encoding; and generate a result image, wherein generating the result image comprises decoding the result image encoding.

9. The non-transitory computer-readable medium of claim 8, wherein the guided image comprises pixel-level features of the reference image inserted into the masked image.

10. The non-transitory computer-readable medium of claim 8, wherein integrating the guided image encoding into the source image encoding comprises aligning pixel-level features of the guided image with features of the source image.

11. The non-transitory computer-readable medium of claim 8, wherein the one or more encoder models comprise a first encoder model and a second encoder model, wherein the second encoder model is a trainable replica of the first encoder model.

12. The non-transitory computer-readable medium of claim 8, wherein processing the guided image and the source image through the one or more encoder models comprises generating feature maps for the guided image and the source image.

13. The non-transitory computer-readable medium of claim 8, wherein processing the guided image and the source image through the one or more encoder models comprises:

processing the guided image and the source image through a variational autoencoder; and processing the guided image and the source image through the one or more encoder models.

14. The non-transitory computer-readable medium of claim 8, wherein the guided image comprises the adapted version of the reference image inserted within the selection of the masked image.

15. A system comprising:

one or more processors; and a memory that stores computer-executable instructions, wherein the computer-executable instructions, when executed, cause the one or more processors to:

receive a user selection of an object to be added to a source image;

receive a selection of an area of the source image to add the object;

generate a masked image based on the source image and the selection;

generate a guided image based on the masked image and a reference image depicting the object, wherein generating the guided image comprises generating a blank image and inserting, into a region of the blank image that is determined from the masked image, an adapted version of the reference image having dimensions matched to the region;

process the guided image and the source image through one or more encoder models to generate a guided image encoding and a source image encoding;

generate a result image encoding based on integrating the guided image encoding into the source image encoding; and generate a result image, wherein generating the result image comprises decoding the result image encoding.

16. The system of claim 15, wherein the guided image comprises pixel-level features of the reference image inserted into the masked image.

17. The system of claim 15, wherein integrating the guided image encoding into the source image encoding comprises aligning pixel-level features of the guided image with features of the source image.

18. The system of claim 15, wherein the one or more encoder models comprise a first encoder model and a second encoder model, wherein the second encoder model is a trainable replica of the first encoder model.

* * * * *